United States Patent
ElMenshawy et al.

(10) Patent No.: US 11,616,450 B2
(45) Date of Patent: Mar. 28, 2023

(54) MODULAR DC-DC CONVERTER AND A BATTERY CHARGING DEVICE INCLUDING THE SAME

(71) Applicant: Qatar Foundation for Education, Science and Community Development, Doha (QA)

(72) Inventors: Mena ElMenshawy, Doha (QA); Ahmed Massoud, Doha (QA)

(73) Assignees: QATAR FOUNDATION FOR EDUCATION, SCIENCE AND COMMUNITY DEVELOPMENT, Doha (QA); QATAR UNIVERSITY, Doha (QA)

( * ) Notice: Subject to any disclaimer, the term of this patent is extended or adjusted under 35 U.S.C. 154(b) by 56 days.

(21) Appl. No.: 16/828,197

(22) Filed: Mar. 24, 2020

(65) Prior Publication Data

US 2020/0313443 A1    Oct. 1, 2020

Related U.S. Application Data

(60) Provisional application No. 62/826,268, filed on Mar. 29, 2019.

(51) Int. Cl.
*H02M 3/335*    (2006.01)
*H02J 7/00*    (2006.01)

(52) U.S. Cl.
CPC ......... *H02M 3/33584* (2013.01); *H02J 7/007* (2013.01); *H02J 2207/20* (2020.01); *H02M 3/33573* (2021.05)

(58) Field of Classification Search
CPC .... H02J 7/007; H02J 2207/20; H02J 2310/48; H02M 3/33584; H02M 1/0058; H02M 1/0077; H02M 3/33573; H02M 3/3376; H02M 1/0083; Y02B 70/10; Y02T 10/70; Y02T 10/7072; Y02T 10/92; Y02T 90/14; B60L 53/22; B60L 55/00
See application file for complete search history.

(56) References Cited

U.S. PATENT DOCUMENTS

| | | | |
|---|---|---|---|
| 10,069,407 B1 * | 9/2018 | Ku | H02M 3/04 |
| 10,742,123 B1 * | 8/2020 | Sigamani | H02M 3/33569 |
| 2009/0103341 A1 | 4/2009 | Lee et al. | |
| 2012/0275197 A1 * | 11/2012 | Yan | H02M 3/337 363/21.02 |
| 2013/0134935 A1 | 5/2013 | Maitra et al. | |
| 2016/0329811 A1 | 11/2016 | Du et al. | |

(Continued)

OTHER PUBLICATIONS

Benedetto, et al; Small-Signal Model for the ISOP DC-DC Converters in the 5-Level T-Rectifier; 2016; IEEE; (8 pages).

(Continued)

*Primary Examiner* — Nha T Nguyen
(74) *Attorney, Agent, or Firm* — K&L Gates LLP

(57) ABSTRACT

A modular DC-DC converter and a battery charging device are provided. The modular DC-DC converter includes a first converter provided at an input side, a plurality of second converters provided at an output side, and a plurality of high-frequency transformers provided between the first converter and the second converters. The first converter and the high-frequency transformers are connected in series at the input side, and the second converters are connected in parallel at the output side.

16 Claims, 10 Drawing Sheets

(56) References Cited

U.S. PATENT DOCUMENTS

2018/0226182 A1* 8/2018 Fe .................... H02M 3/33523
2019/0355506 A1* 11/2019 Fei .................... H02M 3/1584

OTHER PUBLICATIONS

Christen, et al; "Highly Efficient and Compact DC-DC Converter for Ultra-Fast Charging of Electric Vehicles"; 2012: ECCE Europe; (8 pages).
Sato, et al: "High Efficiency Design for ISOP Converter System with Dual Active Bridge DC-DC Converter"; 2016; IEEE; (8 pages).
Krismer, et al; "Accurate Small-Signal Model for an Automotive Bidirectional Dual Active Bridge Converter"; 2008; IEEE; (10 pages).
Lee, et al; "A High-Power DC-DC Converter Topology for Battery Charging Applications"; Jun. 28, 2017; Department of Electric Engineering, Myongi University; (18 pages).

* cited by examiner

MODULAR DC-DC CONVERTER AND A BATTERY CHARGING DEVICE INCLUDING THE SAME

CROSS REFERENCE TO RELATED APPLICATION

The present application claims priority to U.S. Provisional Patent Application No. 62/826,268, filed Mar. 29, 2019, the disclosure of which is incorporated into this specification by reference in its entirety.

BACKGROUND

Low-Speed Electric Vehicles (LS-EVs) are commonly used in retirement communities and suburban areas. LS-EVs operate over short distances and primarily run on batteries. The LS-EVs can be used effectively to perform short-distance trips that last less than ten minutes instead of the traditional automobiles. The LS-EVs may be used in airports, sports complexes, country clubs, vacation resorts, and golf courses.

One of the main problems of LS-EVs is the long time of battery charging. The LS-EVs recharging process is typically done via a standard 120 VAC or 240 VAC single phase outlet. Such a process takes more than eight hours and normally done overnight. Accordingly, rapid recharging of the battery pack is needed to increase the utilization of LS-EVs.

SUMMARY

The present disclosure generally relates to a modular DC-DC converter and a battery charging device including the modular DC-DC for fast charging Low-Speed Electric Vehicles.

In light of the present disclosure, and without limiting the scope of the disclosure in any way, in an aspect of the present disclosure, which may be combined with any other aspect listed herein unless specified otherwise, a modular DC-DC converter is provided. The modular DC-DC converter includes a first converter provided at an input side, a plurality of second converters provided at an output side, and a plurality of high-frequency transformers provided between the first converter and the second converters. The first converter and the high-frequency transformers are connected in series at the input side, and the second converters are connected in parallel at the output side.

In an aspect of the present disclosure, which may be combined with any other aspect listed herein unless specified; otherwise, the first converter includes only one full-bridge converter.

In an aspect of the present disclosure, which may be combined with any other aspect listed herein unless specified otherwise, the second converter includes at least two full-bridge converters.

In an aspect of the present disclosure, which may be combined with any other aspect listed herein unless specified otherwise, the first converter includes at least one of a flyback converter, a forward converter, a push-pull converter, a half-bridge converter, and a full-bridge converter.

In an aspect of the present disclosure, which may be combined with any other aspect listed herein unless specified otherwise, the second converters include two or more of a flyback converter, a forward converter, a push-pull converter, a half-bridge converter, and a full-bridge converter.

In an aspect of the present disclosure, which may be combined with any other aspect listed herein unless specified otherwise, the modular DC-DC converter further comprises a first capacitor coupled with the first converter at the input side.

In an aspect of the present disclosure, which may be combined with any other aspect listed herein unless specified otherwise, the modular DC-DC converter further comprises a second capacitor coupled with one of the second converters at the output side.

In an aspect of the present disclosure, which may be combined with any other aspect listed herein unless specified otherwise, the second converters include three full-bridge converters.

In light of the present disclosure, and without limiting the scope of the disclosure in any way, in an aspect of the present disclosure, which may be combined with any other aspect listed herein unless specified otherwise, a battery charging device is provided. The battery charging device includes a first converter provided at an input side, a plurality of second converters provided at an output side, and a plurality of high-frequency transformers provided between the first converter and the second converters. The first converter and the high-frequency transformers are connected in series at the input side, and the second converters are connected in parallel at the output side.

In an aspect of the present disclosure, which may be combined with any other aspect listed herein unless specified; otherwise, the first converter includes only one full-bridge converter.

In an aspect of the present disclosure, which may be combined with any other aspect listed herein unless specified otherwise, the second converter includes at least two full-bridge converters.

In an aspect of the present disclosure, which may be combined with any other aspect listed herein unless specified otherwise, the first converter includes at least one of a flyback converter, a forward converter, a push-pull converter, a half-bridge converter, and a full-bridge converter.

In an aspect of the present disclosure, which may be combined with any other aspect listed herein unless specified otherwise, the second converters include two or more of a flyback converter, a forward converter, a push-pull converter, a half-bridge converter, and a full-bridge converter.

In an aspect of the present disclosure, which may be combined with any other aspect listed herein unless specified otherwise, the battery charging device further comprises a first capacitor coupled with the first converter at the input side.

In an aspect of the present disclosure, which may be combined with any other aspect listed herein unless specified otherwise, the battery charging device further comprises a second capacitor coupled with one of the second converters at the output side.

In an aspect of the present disclosure, which may be combined with any other aspect listed herein unless specified otherwise, the second converters include three full-bridge converters.

The reader will appreciate the foregoing details, as well as others, upon considering the following detailed description of certain non-limiting embodiments of the modular DC-DC converters according to the present disclosure.

BRIEF DESCRIPTION OF THE DRAWINGS

Features and advantages of the present technology including the modular DC-DC converters and the battery charging device described herein may be better understood by reference to the accompanying drawing in which:

FIG. 2A is a generic multimodule DC-DC converter; FIG. 2B is a FB circuit configuration; FIG. 2C is a HB circuit configuration; FIG. 2D is a DAB circuit configuration; and FIG. 2E is a DAB DC-DC converter based resonant circuit.

FIG. 9A is a diagram of modular input voltage; FIG. 9B is a diagram of input current; FIG. 9C is a diagram of modular output current; and FIG. 9D is a diagram of the overall output current.

Figure 1:
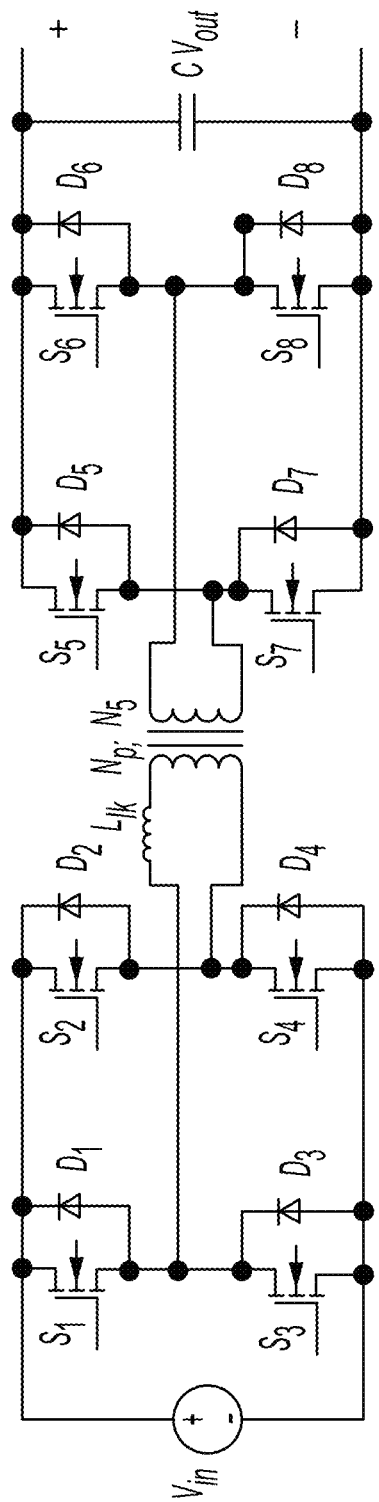
FIG. 1 is a schematic diagram of a DAB converter circuit according to an embodiment of the present disclosure.

The reader will appreciate the foregoing details, as well as others, upon considering the following detailed description of certain non-limiting embodiments of present technology including the modular DC-DC converters and the battery charging device according to the present disclosure. The reader may also comprehend certain of such additional details upon using the present technology including the modular DC-DC converters, the battery charging device, and the control methods described herein.

DETAILED DESCRIPTION

The present disclosure is generally related to a modular DC-DC converter and a battery charging device including the same.

LS-EVs fast charging is necessary to overcome the downtimes caused by the long charging process and to allow for better utilization of the LS-EVs. If the charging process is done in less than one hour with fast charging, and it will need higher charging rates. High power three-phase fast charging has been a well-established technology in industrial EV markets and has allowed for a significant reduction in time, cost, and labor savings. However, there are many challenges when it comes to their application to LS-EVs, which are mainly charged through single-phase circuits, and handled by the consumer.

Generally, there are three charging levels for EVs. In level 1 and level 2, the charging process takes place in a considerable amount of time where the vehicle is charged at home. The main drawback of these charging levels is that the charging process takes from 4 hours to 20 hours to reach full charge depending on the size and the state of charge of the battery. These levels are not applicable for long distances. In other words, in level 1 and level 2 charging methods, additional time is required to reach the full charge, which hinders the transition from the conventional vehicles powered by gasoline to the electric vehicles powered by a battery. In this regard, level 3 charging infrastructure is introduced to reduce the time of the charging process and provide fast refueling. The long charging time is avoided in level 3 fast charging because the battery charging can be achieved in less than thirty minutes. To achieve fast charging, the fast charger's power electronics interfaces should be accurately designed to achieve high power factor and high efficiency, and provide galvanic isolation. In addition, a well-regulated output DC voltage must be obtained.

Fast charging techniques such as Constant-Current Constant-Voltage (CC-CV) and Multistage Constant-Current Constant-Voltage (MCC-CV). MCC-CV can be applied to increase the battery acceptance rate. To have the capability of transferring high power, some advance charging techniques such as CC-CV method with negative pulses and variable frequency pulse charge are utilized to increase charging acceptance.

According to an embodiment of the present disclosure, a modular DC-DC converter for LS-EVs fast charging is developed. Charging at a low voltage of 48 V at the output side requires high current causing challenges when employing a single converter unit. Typically, two different approaches of DC-DC converters are employed for EVs fast charger applications. The first approach is using two-level voltage source converters, where the semiconductor devices are connected in series and/or parallel to achieve the desired ratings. The second approach is using modular converters that can be of two-level or multilevel nature.

DC-DC converters with modular structure offer easier maintenance such as hot-swapping capability, redundancy, scalability, and ride-through capability. Moreover, the required rating can be achieved through the employed modules, where each module handles a fraction of the total required power. The modularity concept is applied for the entire stage, including transformer and power electronics.

One of the attractive DC-DC converters used in fast charging EVs applications is the multimodule DC-DC converters-based Dual Active Bridge (DAB) topology because bidirectional power flow can be achieved. In addition, higher switching frequency in the AC link can be achieved, which would result in significant weight and size reduction. Furthermore, soft switching techniques can be applied to avoid high switching losses.

In the present disclosure, a low cost, high efficiency, DC-DC converter for LS-EVs fast chargers is provided. Different DC-DC converters are prepared for EVs applications. In addition, according to the system specifications, the configuration of the DC-DC converter power stage is provided. Moreover, to study the dynamic performance of multimodule DC-DC converters, a generalized small-signal analysis applicable for Input-Series Input-Parallel Output-Series Output-Parallel (ISIP-OSOP) is provided. This is achieved by studying the small-signal analysis of Full-Bridge Phase-Shift (FB-PS) DC-DC converter, two-module Input-Parallel Output-Series (IPOS), three-modules Input-Series Output-Parallel (ISOP), and four-module Input-Series Input-Parallel Output-Series (ISIPOS), respectively. Accordingly, the generalized model is used to derive the small-signal model for the ISOP DC-DC converter. Furthermore, the control method of the ISOP DC-DC converter is provided to guarantee equal distribution of power among the modules.

It should be understood that the battery sizes and capacities vary (36 V-48 V; 140 Ahr-200 Ahr), the fast charger resultant power rating will vary between 2.5 kW-6.6 kW. Accordingly, to achieve greater versatility in realizing fast chargers for LS-EVs, modular design will be an effective solution to meet the varying needs of these batteries. To meet the varying power needs of the vehicles, a modular power stage that ranges between 1.5 kW-2 kW can be used as a building block. Through the modular power stage, various charger sizes and models can be realized using a few building blocks according to an embodiment of the present disclosure.

According to an embodiment of the present disclosure, the power conversion stage developed will be in a modular manner, where each modular power stage is rated at 1.5 kW. Battery charging via single-phase supply is demanded by consumers because single-phase charging allows the consumers to charge their EVs conveniently through the standard single-phase outlets available at their homes.

The flow of energy can be from the grid to the vehicle (G2V) and can also be from the vehicle to the grid (V2G). EVs charger, according to an embodiment, includes two stages: the first stage is an AC-DC converter interfacing with the grid. This converter has two roles: operating at unity power factor and providing low harmonic distortion for both input and output voltage and current. The second stage is a DC-DC converter. This converter must control the charge current, ensure the proper voltage delivered to the battery, and reduce both the voltage and current ripple. To realize both G2V and V2G modes, the two stages must support bidirectional power flow.

The DC-DC converters, according to an embodiment, are the basic isolated converters, basic resonant converters, two-level DAB converters, and multimodule converters.

The requirements for designing an EV battery charger can be highlighted in high power density, high efficiency, low cost, and galvanic isolation. Increasing the switching frequency would reduce the passive elements size and cost. However, increasing the switching frequency would increase the switching losses. Accordingly, soft switching techniques and resonant topologies are employed to increase the switching frequency without sacrificing the efficiency of the power stage. Another requirement that is necessary for the EV charger system is to select a topology that has the ability to control the high current at the output side. In addition, to electrically disconnect the grid from the vehicles, galvanic isolation is required. This can be done by employing a high-frequency transformer according to an embodiment.

Isolated topology can be classified into two categories: single-ended and double-ended. The merits of double-ended topology over the single-ended topology are that it requires a smaller core and does not require an extra reset winding. The order from low-power to high-power of the basic isolated DC-DC converters is Flyback, Forward, Push-Pull, Half-Bridge (HB), and Full-Bridge (FB).

In Table 1, the basic isolated DC-DC converters are compared in terms of the output power range, cost, number of active switches, and electrical stress.

TABLE 1

COMPARISON BETWEEN BASIC ISOLATED DC-DC CONVERTERS

| Topology | Power Range | Transformer Utilization | Number of Active Switches | Cost |
|---|---|---|---|---|
| Flyback | Lowest | Single-ended | 1 | Lowest |
| Forward | ↓ | Single-ended | 1 | ↓ |
| Push-Pull | ↓ | Single-ended | 2 | ↓ |
| Half-Bridge | | Double-ended | 2 | |
| Full-Bridge | Highest | Double-ended | 4 | Highest |

As illustrated in Table 1, FB DC-DC converter can be employed in higher power applications when compared to other topologies. However, FB converter suffers from high switching losses since all switches operate under hard switching. To avoid the high switching losses associated with the conventional FB converter, a Phase-Shifted Full-Bridge (PS-FB) DC-DC converter is another FB configuration that is used in EV battery chargers applications. This topology is different from the conventional one in the control methodology. Using the PS-FB DC-DC converter allows for lower switching losses through the zero-voltage switching.

Resonant converters can achieve very low switching losses enabling such converters to operate at a high switching frequency. The basic resonant converters are Series Resonant Converter (SRC), Parallel Resonant Converter (PRC), and Series-Parallel Converter denoted as (SPRC or LCC resonant converter). In SRC, the DC gain is always less than one. The load impedance is very large compared to the resonant tank impedance at light load situations, causing difficulties in regulating the output voltage at light load circumstances. The SRC major drawbacks can be highlighted in the regulation of the output voltage at light load, high energy circulation, and high current at turn off periods as the voltage at the input side increases.

Unlike the SRC, in PRC the light load regulation problem is avoided. However, PRC operates at higher switching frequency as the voltage at the input side increases. In addition, the circulating energy is much higher even at light load conditions when compared to SRC. Therefore, the PRC major drawbacks can be highlighted in high energy circulation and high current at turn off periods as the voltage at the input side increases.

According to an embodiment of the present disclosure, the multimodule DC-DC converters include a combination of both SRC and PRC. SPRC has the advantages of both SRC and PRC. In this topology, the output voltage can be regulated at no-load condition. In addition, the circulating energy is smaller when compared with PRC. Moreover, the input current is smaller when compared to PRC while higher when compared to SRC. Therefore, it can be said that the circulating energy in SPRC is smaller than PRC.

Similar to SRC and PRC, SPRC operates at higher switching frequency as the input voltage increases. In addition, as the input voltage increases, the turn off current of the switching device also increases. Therefore, it can be observed that the SPRC combines the advantages of SRC and PRC, namely, regulation of the output voltage at no-load conditions and smaller circulating energy. However, the three topologies may not be adjusted at high input voltage since high switching losses and high conduction losses will result. In addition, high circulating energy will occur at high voltage at the input side.

Another resonant converter configuration is the LLC resonant converter. In this converter, two resonant frequencies are available at the SPRC. The advantages of this configuration can be summarized in ZVS capability even at no-load conditions, hence, reduced switching losses, which will lead to high efficiency. In addition, the ability to regulate the output voltage at all load conditions. Moreover, due to the ZVS at the primary side and the ZCS at the secondary side, an LLC resonant converter provides high efficiency, making the LLC a promising candidate topology. An HB-LLC resonant converter has been designed and implemented for EV battery charging applications. The DC-DC converter is designed to achieve high efficiency, wide output voltage range, low cost, and low switching losses to maximize the energy transfer.

LLC topology may lose soft switching in the reverse mode. Therefore, limiting the bidirectional power transfer capabilities and compromising efficiency. However, through the employment of the bidirectional CLLC resonant converter, this can be avoided. In forward (G2V) and reverse (V2G) modes, the CLLC resonant converter operates similar to the LLC resonant converter. Therefore, the ZVS and the ZCS in both modes can be attained, and the switching losses can be reduced, hence, enhancing the efficiency of the charger.

According to an embodiment of the present disclosure, a DAB DC-DC converter is a topology that can be used for low and high-power applications. The DAB configuration as shown in FIG. 1 includes two active bridges that are connected via a medium/high-frequency AC transformer. DAB can be constructed using a single-phase bridge or a three-phase bridge depending on the design criteria. The 2L-DAB shown in FIG. 1 usually operates in a square wave mode. The intermediate transformer leakage inductance limits the maximum power flow and is used as the energy transferring element. This topology is capable of bidirectional power flow that can be achieved by controlling the phase shift between the two bridges and the magnitude of the output voltage per bridge. The switches can be switched at ZVS and/or Zero Current Switching (ZCS). Accordingly, switching losses are reduced, and the power efficiency is increased. However, ZVS operation (i.e., soft switching features) is not ensured at light load. In other words, the conventional DAB soft switching region is limited to a narrow output voltage range. However, in EV battery charger applications, when the battery is charged, the converter will be operating at no load for a period of time, and the load will be absolutely zero. Therefore, to achieve the project requirements which is achieving high efficiency, ZVS should be maintained at all load conditions. Accordingly, several control strategies are proposed in order to increase the soft switching range and reduce the transformer current. In addition, a high conversion ratio can be obtained by choosing the transformer turns ratio.

To enhance the DAB soft switching range, the Series R-DAB (SR-DAB) is provided. In this topology, an extra capacitor is only required. SR-DAB is usually modulated through a frequency modulation scheme. However, to modulate the power transfer, a large switching frequency range is required which will cause difficulties in the filter and control design.

According to an embodiment, a frequency modulated CLLC-R-DAB is provided. In this topology, the converter can operate over a large variation of the input voltage while maintaining soft switching capability. A smaller switching frequency range is used to modulate the CLLC-R-DAB converter when compared to SR-DAB. According to an embodiment, a DAB with a tuned LCL network is provided. It shows that the bridge current magnitude is reduced when operated at the LCL network tuned frequency. This minimized the high-frequency link conduction losses and enhanced the utilization of the semiconductor devices in both full bridges.

According to an embodiment, a DAB with a tuned CLLC structure is provided to increase the power density of the converter. This topology reduces the required number of magnetic components and the transformer magnetizing inductance while maintaining similar operating characteristics as the LCL-DAB topology.

Through the modular design of DAB, easier scalability of the system can be obtained. In addition, through inserting redundant modules, system reliability is achieved. The possible architectures of connecting multiple DAB units are classified into four main categories which are: Input-Series Output-Series (ISOS), Input-Parallel Output-Parallel (IPOP), Input-Series Output-Parallel (ISOP), Input-Parallel Output-Series (IPOS).

To meet the voltage and power requirements of EV fast charger applications, two different approaches are established. The first approach is through integrating semiconductor devices into the two-level converter topologies with series/parallel connections. However, series-connection of power switches results in unsymmetrical sharing of voltage among the switching devices because of the switches' unequal parameters such as the switching delays, leakage inductance, and collector-to-emitter capacitance. Accordingly, voltage balancing methods are required to avoid any failures that can occur because the failure in one element will lead to the entire converter failure, resulting in low reliability.

In the second approach, power electronic converters are usually pursued to be built in a modular manner. Modular converters contain several numbers of smaller modules. Building converters in a modular manner is a cost-effective solution. In addition, smaller modules can be hot-swapped in failure cases, which makes the maintenance of such converters easier. Moreover, the number of modules can be scaled up according to the power rating of the system. Furthermore, by installing more modules, the concept of redundancy can be established. In other words, in modular structure-based DC-DC converters, each cell handles a small portion of the total input power. Consequently, the selected power switches are of lower voltage ratings, hence, higher switching frequency capability. Therefore, the transformer size will be reduced due to the increase in the switching frequency. To avoid the demerits associated with the first approach modular converters topologies such as Multimodule Converters are used to provide modularity feature and achieve voltage and power requirements, where multimodule converters based topologies include resonant converters as well as HB and FB converters.

FIGS. 2A-2E show multimodule DC-DC converters with configurations that can be employed in EV charger applications. In this converter, each Sub-Module (SM) operates at a single module rated voltage and contributes with a fraction of the total output power. Accordingly, such converters can operate with a higher switching frequency without facing challenges in their design and without sacrificing conversion efficiency.

This DC-DC converter is based on the modular structure and can offer unidirectional and bidirectional power flow according to an embodiment of the present disclosure. In this arrangement, extra control techniques are applied to ensure equal voltage and/or current sharing between the SMs.

Figure 2A:
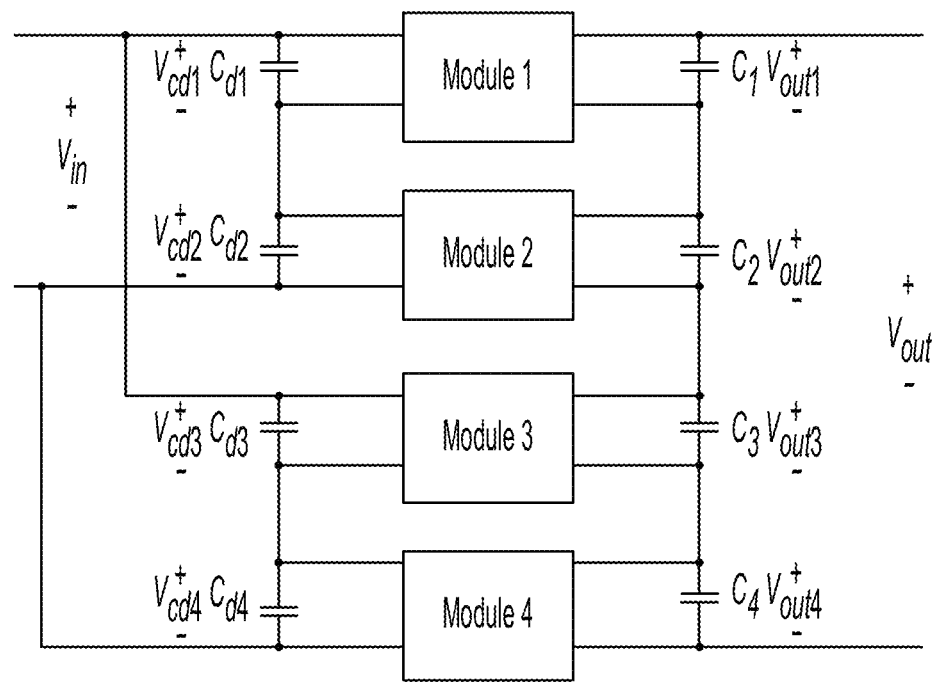
FIGS. 2A-2E are schematic diagrams of multimodule DC-DC converter configurations.
Figure 2B:
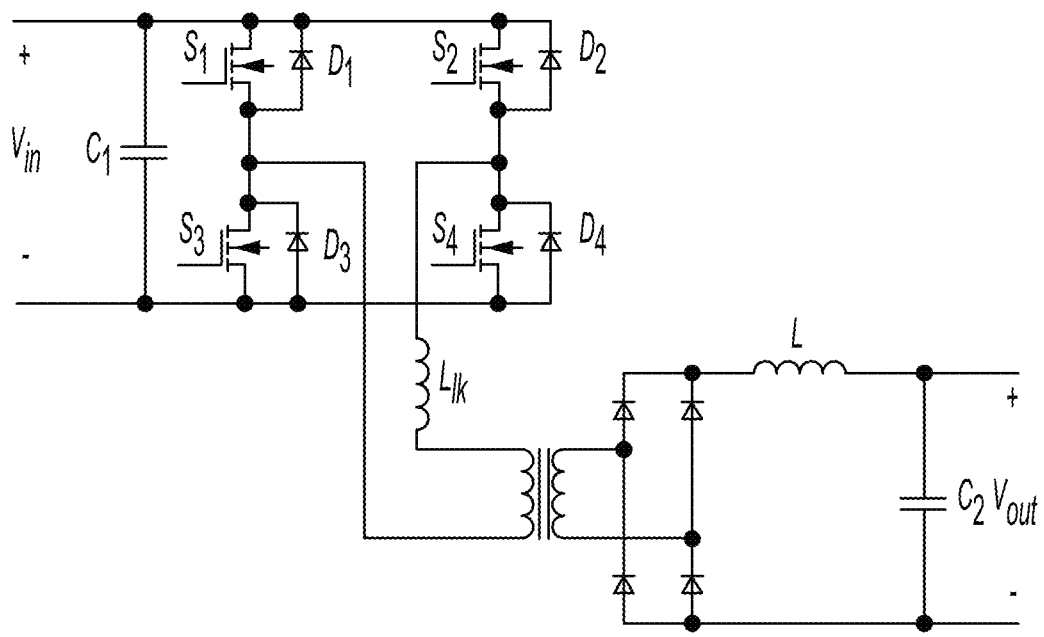
Figure 2C:
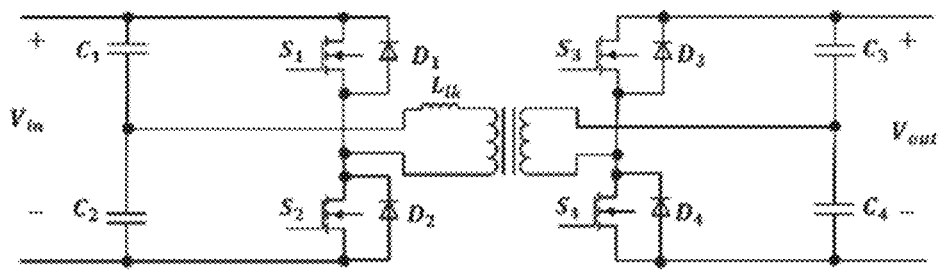
Figure 2D:
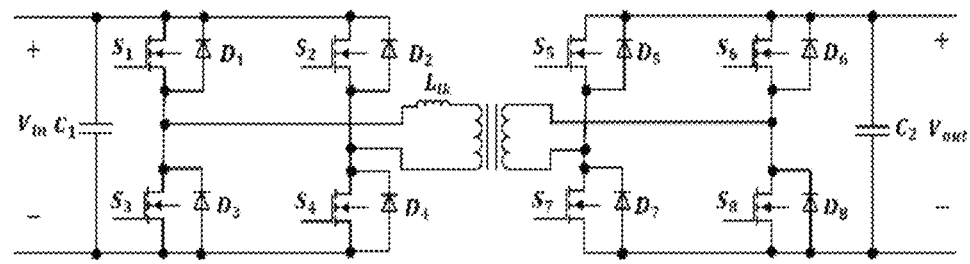
Figure 2E:
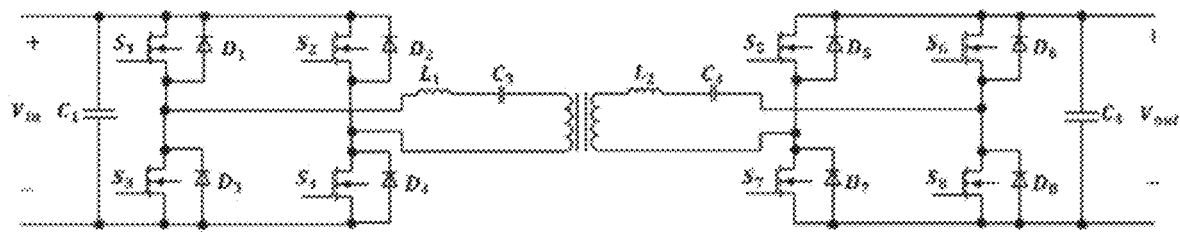

FIG. 2A is a generic multimodule DC-DC converter. FIG. 2B is a FB circuit configuration. FIG. 2C is a HB circuit configuration. FIG. 2D is a DAB circuit configuration. FIG. 2E is a DAB DC-DC converter-based resonant topology.

In FIG. 2E, the FB converters adjust their frequency according to the AC link resonant frequency in order to generate across the primary and secondary winding of the transformer voltage waveform that has a sinusoidal behavior. This would enable the switching devices to operate near to the ZCS.

Multimodule DC-DC converter-based DAB can achieve higher switching frequency in the AC link, which results in weight and size reduction. Moreover, through the employment of soft switching techniques, the losses of the converter are reduced, and thereby higher efficiency can be achieved.

Figure 3:
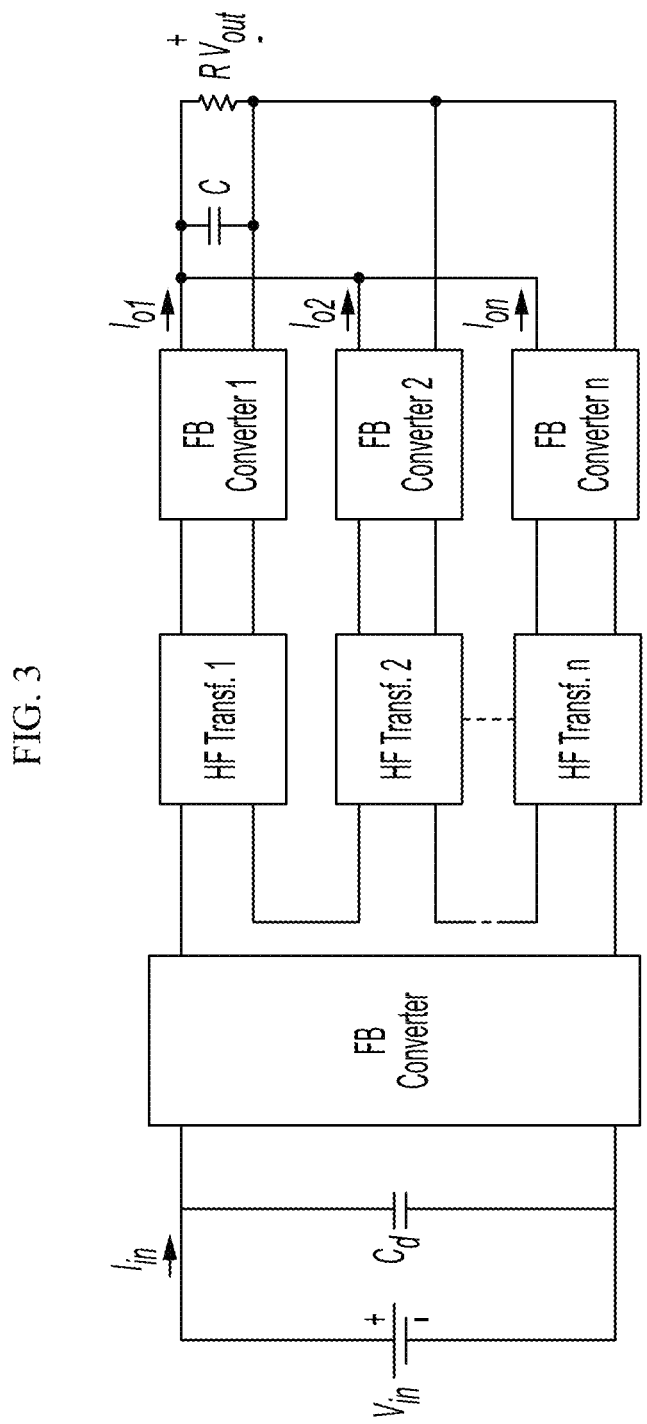
FIG. 3 is a schematic diagram of a fast charger DC-DC converter according to an embodiment of the present disclosure.

According to an embodiment, the system specifications are as follows: the module's input voltage is 110 V @ 1.5 kW and the module's input current is 13 A @ 1.5 kW. However, the overall output voltage and output current are 48 V and 93.75 A, respectively. Consequently, the modular power stage connection based on the conventional DAB DC-DC converter is ISOP. However, the input specifications can be handled by only one converter, and due to the high output current at the output side, more than one converter may be required to avoid high power losses and achieve the highest efficiency. Therefore, the selected topology is multimodule DC-DC converter DAB, and only one bridge is employed at the primary side, and the modularity concept will be applied on the high-frequency transformer and the second bridge where the connection of the modules will be ISOP as shown in FIG. 3. The parallel connection at the output side is not only needed due to the high output current such that all the modules share equal currents but also to provide small ripple current that will accordingly reduce the capacitor size and avoid any damage for the battery during the charging process.

According to an embodiment of the present disclosure, a generalized small-signal analysis applicable for ISIP-OSOP configuration is provided.

Figure 4:
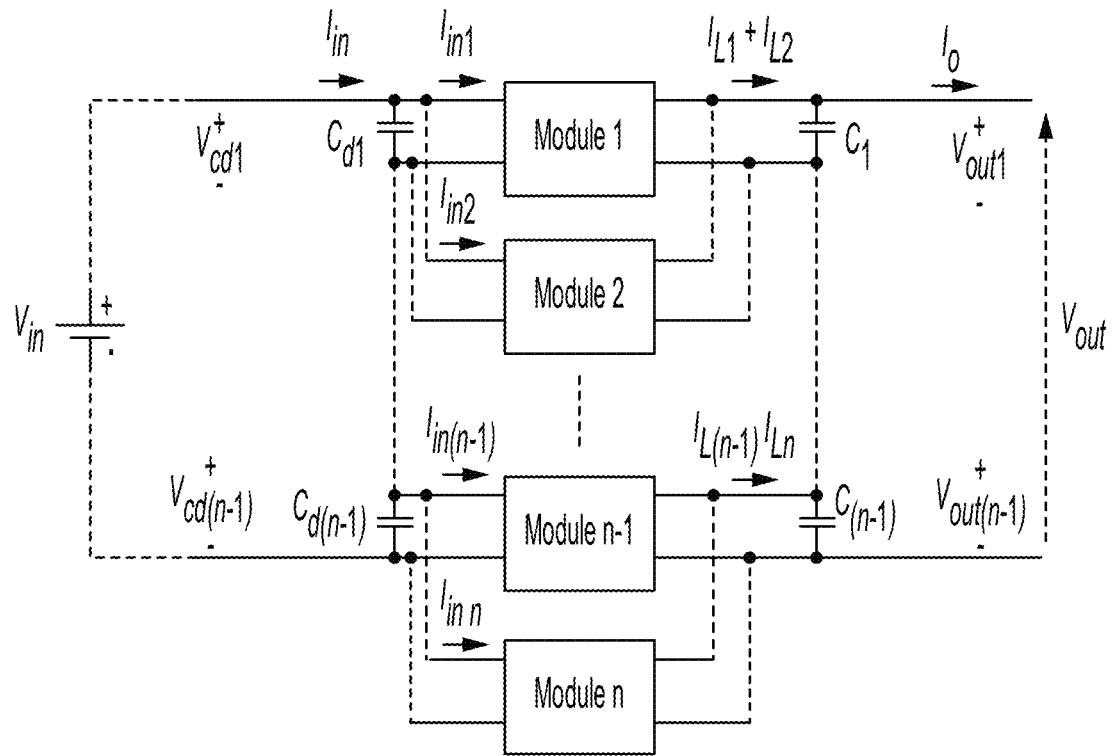
FIG. 4 is a schematic diagram of a fast charger DC-DC converter circuit according to an embodiment of the present disclosure.
Figure 4:
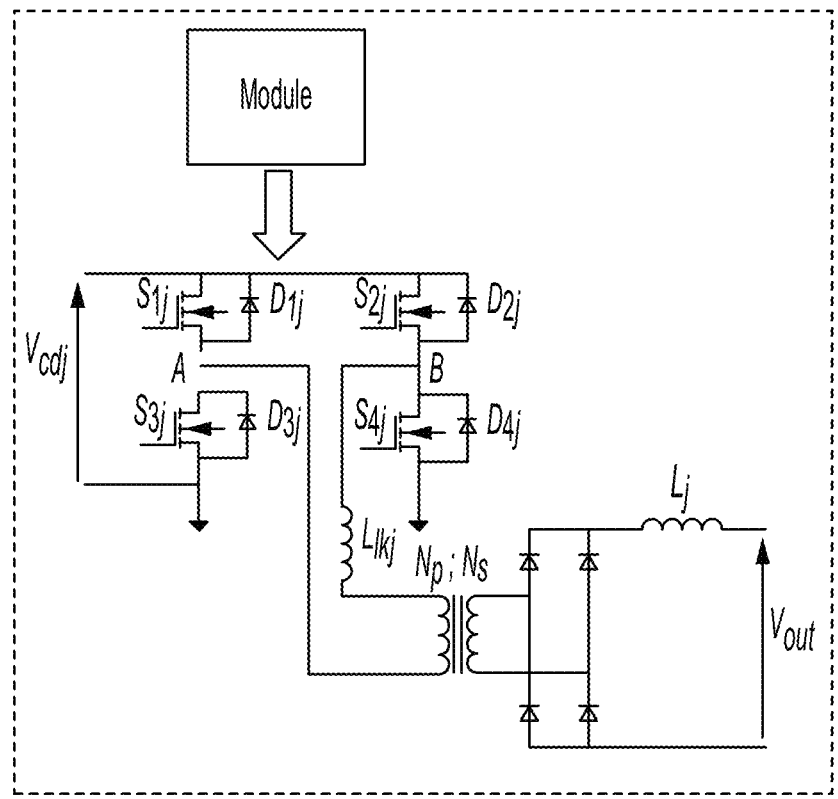

The ISIP-OSOP generic DC-DC converter configuration as shown in FIG. 4 includes n isolated DC-DC modules that are connected in series and/or parallel at the input side, and in series and/or parallel at the output side.

By ensuring Input Current Sharing (ICS) and IVS, the input current for each module is reduced to $$\frac{I_{in}}{\alpha},$$

and the input voltage for each module is reduced to $$\frac{V_{in}}{\beta}.$$

In which, $I_{in}$ is the input current and $V_{in}$ input voltage of the ISIP-OSOP DC-DC converter, and $\alpha$ is the number of modules connected in parallel and $\beta$ is the number of modules connected in series at the input side. Similarly, by ensuring OCS and Output Voltage Sharing (OVS), the output current for each module is reduced to $$\frac{I_o}{a},$$

and the output voltage for each module is reduced to $$\frac{V_o}{b}.$$

In which $I_o$ output current and $V_o$ is the output voltage of the ISIP-OSOP DC-DC converter, and a is the number of modules connected in parallel and b is the number of modules connected in series at the output side.

Figure 5:
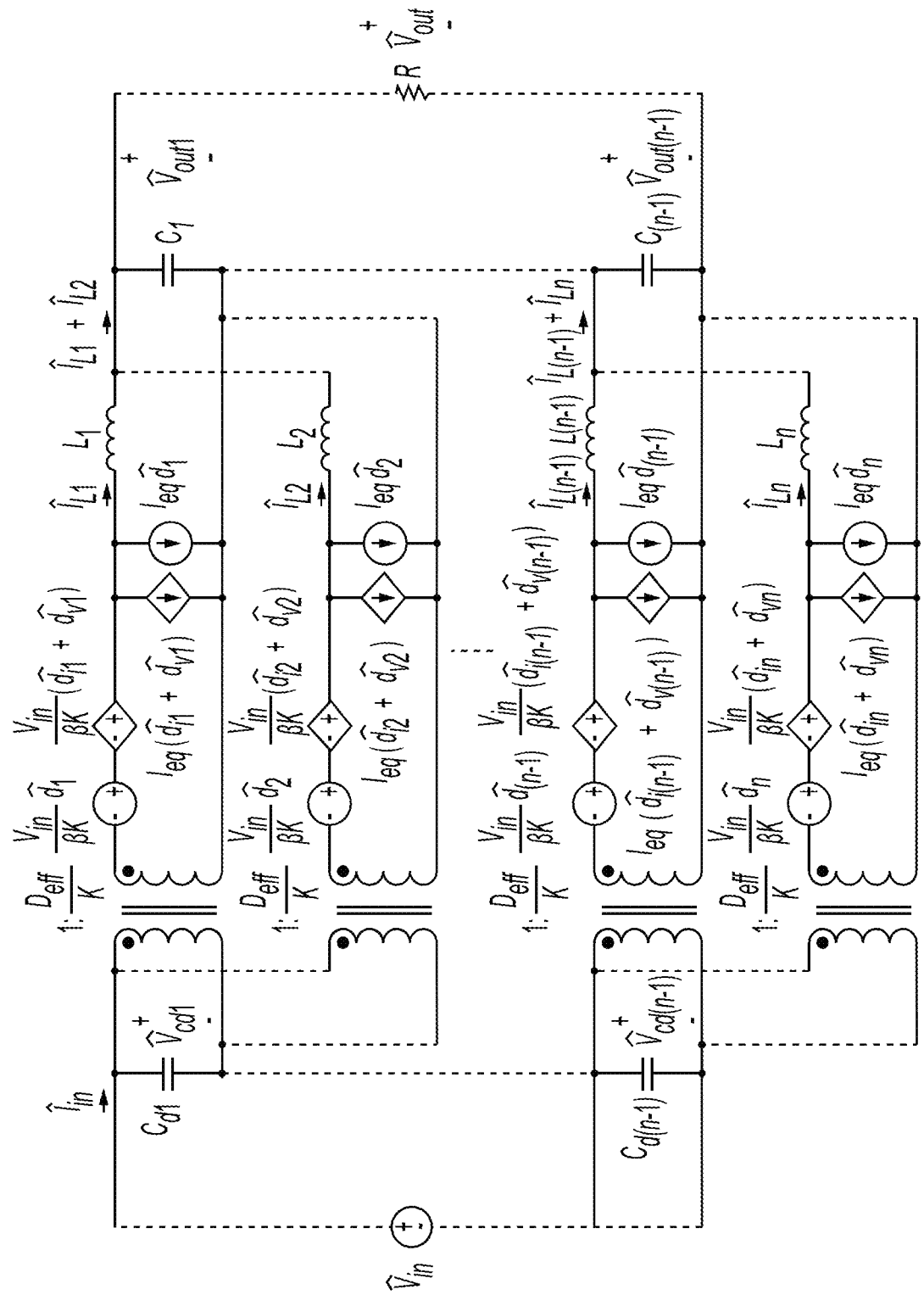
FIG. 5 is a schematic diagram of an n-module ISIP-OSOP DC-DC converter small-signal model according to an embodiment of the present disclosure.

According to an embodiment, the small-signal model for the ISIP-OSOP converter is provided and shown in FIG. 5. The input current and voltage for each module is $$\frac{I_{in}}{\alpha} \text{ and } \frac{V_{in}}{\beta},$$

respectively, and the output current and voltage for each module is $$\frac{I_o}{a} \text{ and } \frac{V_o}{b},$$

respectively. Therefore, the load resistance for each module is $$\frac{a}{b}R.$$

Accordingly, $\hat{d}_{ij}$ and $\hat{d}_{vj}$ which are the effect of changing the filter inductor current and the effect of changing the input voltage on the duty cycle modulation, as well as $I_{eq}$ presented in FIG. 5 can be expressed as follows:

$$\hat{d}_{ij} = -\frac{4\beta L_{lk} f_s}{KV_{in}} \hat{i}_{Lj}, \, j = 1, 2, \ldots, n \quad (1)$$

Equation (1) can be re-written as:

$$\hat{d}_{ij} = -\frac{\beta KR_d}{V_{in}} \hat{i}_{Lj}, \, j = 1, 2, \ldots, n \quad (2)$$

Where $R_d = \frac{4L_{lk} f_s}{k^2}.$ $$\hat{d}_{vj} = -\frac{4\beta b L_{lk} f_s D_{eff}}{ak^2 RV_{in}} \hat{v}_{cdj}, \, j = 1, 2, \ldots, n \quad (3)$$

Equation (3) can be re-written as:

$$\hat{d}_{vj} = -\frac{\beta b R_d D_{eff}}{aRV_{in}} \hat{v}_{cdj} \quad j=1,2,\ldots,n \tag{4}$$

$$I_{eq} = \frac{bV_{in}}{\beta aKR} \tag{5}$$

The n module ISIP-OSOP DC-DC converter small-signal model is built based upon the small-signal model. The input voltage perturbation is denoted as $\hat{v}_{in}$, however, the input voltage perturbation per module is represented as $\hat{v}_{cdj}$, where $j=1,2,\ldots,\beta$. The capacitor voltage perturbations are represented as $\hat{v}_{outj}$, where $j=1,2,\ldots,b$.

Based on the feature of modularity and to reduce the small-signal transfer functions in terms of complexity, it is assumed that the modules have an equal effective duty cycle, transformer turns ratio, capacitor, and inductor values. Accordingly, $K_1=K_2=\ldots=K_n=K$, $C_1=C_2=\ldots=C_n=C$, $C_{d1}=C_{d2}=\ldots=C_{dn}=C_d$ and $L_1=L_2=\ldots=L_n=L$. In addition, it is also assumed that all modules share the same input voltage. Accordingly, the DC input voltage of each module is $$\frac{v_{in}}{\beta}.$$

Although, each module has a different duty cycle perturbation, it is assumed that all the modules have the same normalized time shift. Moreover, the ESR of the output capacitance is considered in this model.

The following small-signal equations are obtained by applying KVL and KCL:

$$\begin{cases} \frac{D_{eff}}{K}\hat{v}_{cd1} + \frac{v_{in}}{\beta K}(\hat{d}_{i1} + \hat{d}_{v1} + \hat{d}_1) = sL\hat{\imath}_{L1} + \hat{v}_{out1} \\ \frac{D_{eff}}{K}\hat{v}_{cd2} + \frac{v_{in}}{\beta K}(\hat{d}_{i2} + \hat{d}_{v2} + \hat{d}_2) = sL\hat{\imath}_{L2} + \hat{v}_{out2} \\ \vdots \\ \frac{D_{eff}}{K}\hat{v}_{cdn} + \frac{v_{in}}{\beta K}(\hat{d}_{in} + \hat{d}_{vn} + \hat{d}_n) = sL\hat{\imath}_{Ln} + \hat{v}_{outn} \end{cases} \tag{6}$$

$$\begin{cases} \hat{\imath}_{L11} + \hat{\imath}_{L21} + \ldots + \hat{\imath}_{La1} = \frac{sC}{sR_cC+1}\hat{v}_{out1} + \frac{\hat{v}_{out}}{R} \\ \hat{\imath}_{L12} + \hat{\imath}_{L22} + \ldots + \hat{\imath}_{La2} = \frac{sC}{sR_cC+1}\hat{v}_{out2} + \frac{\hat{v}_{out}}{R} \\ \vdots \\ \hat{\imath}_{L1b} + \hat{\imath}_{L2b} + \ldots + \hat{\imath}_{Lab} = \frac{sC}{sR_cC+1}\hat{v}_{outn} + \frac{\hat{v}_{out}}{R} \end{cases} \tag{7}$$

Adding equations in (7):

$$\sum_{i=1}^{a}\sum_{j=1}^{b}\hat{\imath}_{Lij} = \frac{sC}{sR_cC+1}\hat{v}_{out} + \frac{b\hat{v}_{out}}{R} \tag{8}$$

Equation (8) can be written as:

$$\sum_{i=1}^{a}\sum_{j=1}^{b}\hat{\imath}_{Lij} = \hat{v}_{out}\left(\frac{sRC + sbR_cC + b}{R(1+sR_cC)}\right) \tag{9}$$

Defining the summation terms of the module's input and output voltage appearing after summing up equations in (6):

$$\sum_{j=1}^{n}\hat{v}_{cdj} = \gamma\hat{v}_{in} \tag{10}$$

Where;

$\gamma=1$, if all the modules at the input side are connected in series.

$\gamma=\alpha$, if all the modules at the input side are connected in parallel.

$$\gamma = \left(1 + \frac{a}{\beta}\right),$$

if the modules at the input side are connected in series and parallel.

$$\sum_{j=1}^{n}\hat{v}_{outj} = c\hat{v}_{out} \tag{11}$$

Where;

c=1, if all the modules at the output side are connected in series.

c=a, if all the modules at the output side are connected in parallel.

$$c = \left(1 + \frac{a}{b}\right),$$

if the modules at the output side are connected in series and parallel.

Control-to-output voltage transfer function: The relation between the output voltage and the duty cycle is obtained by adding up equations in (6), assuming $\hat{v}_{in}=0$, and $\hat{d}_k=0$, where $k=1,2,\ldots,n$ and $k\neq j$, and substituting (2), (4), (9), (10) and (11).

Adding equations in (6):

$$\frac{D_{eff}}{K}\sum_{j=1}^{n}\hat{v}_{cdj} + \frac{V_{in}}{\beta K}\left(\sum_{j=1}^{n}\hat{d}_{ij} + \sum_{j=1}^{n}\hat{d}_{vj} + \sum_{j=1}^{n}\hat{d}_j\right) = sL\sum_{j=1}^{n}\hat{\imath}_{Lj} + \sum_{j=1}^{n}\hat{v}_{outj} \tag{12}$$

$$\frac{D_{eff}}{K}\sum_{j=1}^{n}\hat{v}_{cdj} + \frac{V_{in}}{\beta K}\left(\sum_{j=1}^{n}-\frac{\beta KR_d}{V_{in}}\hat{\imath}_{Lj} + \sum_{j=1}^{n}-\frac{\beta b R_d D_{eff}}{aRV_{in}}\hat{v}_{cdj} + \hat{d}_1\right) = \tag{13}$$

$$sL\sum_{j=1}^{n}\hat{\imath}_{Lj} + \sum_{j=1}^{n}\hat{v}_{outj}$$

-continued $$\frac{D_{eff}}{K}\gamma\hat{v}_{in} + \frac{V_{in}}{\beta K}\left(\sum_{j=1}^{n} -\frac{\beta K R_d}{V_{in}}\hat{i}_{Lj} + \frac{\beta b R_d D_{eff}}{aRV_{in}}\gamma\hat{v}_{in} + \hat{d}_1\right) = \quad (14)$$

$$sL\sum_{j=1}^{n}\hat{i}_{Lj} + c\hat{v}_{out}$$

Further simplification for (14) would result in (15)

$$G_{vd} = \frac{\hat{v}_{out}}{\hat{d}_j} = \frac{\frac{V_{in}}{\beta K}(1 + sR_cC)}{s^2LC\left(1 + \frac{bR_c}{R}\right) + s\left(\frac{bL}{R} + R_dC\left(1 + \frac{bR_c}{R}\right) + cR_cC\right) + \frac{bR_d}{R} + c} \quad (15)$$

Control-to-filter inductor current transfer function: The relation between the filter inductor current and the duty cycle is obtained by using (9) to find the following equation:

$$\hat{v}_{out} = \frac{R(1 + sR_cC)}{sRC + sbR_cC + b}\sum_{i=1}^{a}\sum_{j=1}^{b}\hat{i}_{Lij} \quad (16)$$

Substituting (16) in (14), and assuming $\hat{v}_{in}=0$, and $\hat{d}_k=0$, where $k=1,2,\ldots,n$ and $k\neq j$.

$$\frac{V_{in}}{\beta K}\hat{d}_1 - R_d\sum_{j=1}^{n}\hat{i}_{Lj} = sL\sum_{j=1}^{n}\hat{i}_{Lj} + \frac{cR(1 + sR_cC)}{sRC + sbR_cC + b}\sum_{j=1}^{n}\hat{i}_{Lj} \quad (17)$$

Further simplification for (17) would result in (18).

$$G_{id} = \frac{\hat{i}_L}{\hat{d}} = \frac{\frac{V_{in}}{\beta K}(b + sRC + sbR_cC)}{R\left(s^2LC\left(1 + \frac{bR_c}{R}\right) + s\left(\frac{bL}{R} + R_dC\left(1 + \frac{bR_c}{R}\right) + cR_cC\right) + \frac{bR_d}{R} + c\right)} \quad (18)$$

Output Impedance

Similarly, as derived in the small-signal modeling of an ISOP DC-DC converter based FB topology [12], the output impedance of the ISIP-OSOP converter can be found by rewriting the KCL equation in (7), such that:

$$\begin{cases} \hat{i}_{L11} + \hat{i}_{L21} + \ldots + \hat{i}_{La1} + \hat{i}_{out} = \frac{sC}{sR_cC+1}\hat{v}_{out1} + \frac{\hat{v}_{out}}{R} \\ \hat{i}_{L12} + \hat{i}_{L22} + \ldots + \hat{i}_{La2} + \hat{i}_{out} = \frac{sC}{sR_cC+1}\hat{v}_{out2} + \frac{\hat{v}_{out}}{R} \\ \vdots \\ \hat{i}_{L1b} + \hat{i}_{L2b} + \ldots + \hat{i}_{Lab} + \hat{i}_{out} = \frac{sC}{sR_cC+1}\hat{v}_{outn} + \frac{\hat{v}_{out}}{R} \end{cases} \quad (19)$$

Summing equations in (19):

$$\sum_{i=1}^{a}\sum_{j=1}^{b}\hat{i}_{Lij} = \frac{sC}{sR_cC+1}\hat{v}_{out} + \frac{b\hat{v}_{out}}{R} - b\hat{i}_{out} \quad (20)$$

Accordingly, (7) is modified as follows:

$$\sum_{i=1}^{a}\sum_{j=1}^{b}\hat{i}_{Lij} = \hat{v}_{out}\left(\frac{sRC + sbR_cC + b}{R(1 + sR_cC)}\right) - b\hat{i}_{out} \quad (21)$$

The relationship between the output voltage and the output current is obtained by assuming $\hat{v}_{in}=0$, and $\hat{d}_j=0$, $j=1,2,\ldots,n$, adding all equations in (6-6), and substituting (2), (4), (10), (11), and (21).

$$\frac{V_{in}}{\beta K}\left(-\frac{\beta K R_d}{V_{in}}\right)\sum_{j=1}^{n}\hat{i}_{Lj} = sL\sum_{j=1}^{n}\hat{i}_{Lj} + c\hat{v}_{out} \quad (22)$$

$$-R_d\left(\hat{v}_{out}\left(\frac{sRC + sbR_cC + b}{R(1 + sR_cC)}\right) - b\hat{i}_{out}\right) = \quad (23)$$

$$sL\left(\hat{v}_{out}\left(\frac{sRC + sbR_cC + b}{R(1 + sR_cC)}\right) - b\hat{i}_{out}\right) + c\hat{v}_{out}$$

Further simplification for (23) would result in (24).

$$Z_{out} = \frac{\hat{v}_{out}}{\hat{i}_{out}} = \frac{b(R_d + sL)(1 + sR_cC)}{s^2LC\left(1 + \frac{bR_c}{R}\right) + s\left(\frac{bL}{R} + R_dC\left(1 + \frac{bR_c}{R}\right) + cR_cC\right) + \frac{bR_d}{R} + c} \quad (24)$$

Converter Gain

The relationship between the output voltage and the input voltage is obtained by assuming $\hat{d}_j=0$, $j=1,2,\ldots,n$, adding all equations in (6), and substituting (2), (4), (9), (10) and (11) in the added equation.

$$\frac{D_{eff}}{K}\sum_{j=1}^{n}\hat{v}_{cdj} + \frac{V_{in}}{\beta K}\left(\sum_{j=1}^{n} -\frac{\beta K R_d}{V_{in}}\hat{i}_{Lj} + \sum_{j=1}^{n}\frac{\beta b R_d D_{eff}}{aRV_{in}}\hat{v}_{cdj}\right) = \quad (25)$$

$$sL\sum_{j=1}^{n}\hat{i}_{Lj} + \sum_{j=1}^{n}\hat{v}_{outj}$$

$$\frac{D_{eff}}{K}\gamma\left(1 + \frac{bR_d}{aR}\right)\hat{v}_{in} = (sL + R_d)\left(\hat{v}_{out}\left(\frac{sRC + sbR_cC + b}{R(1 + sR_cC)}\right)\right) + c\hat{v}_{out} \quad (26)$$

Rearranging (26) would result in (27).

$$G_{vg} = \frac{\hat{v}_{out}}{\hat{v}_{in}} = \frac{\frac{D_{eff}}{K}\gamma\left(1 + \frac{bR_d}{aR}\right)(1 + sR_cC)}{s^2LC\left(1 + \frac{bR_c}{R}\right) + s\left(\frac{bL}{R} + R_dC\left(1 + \frac{bR_c}{R}\right) + cR_cC\right) + \frac{bR_d}{R} + c} \quad (27)$$

The same analysis is carried out in modular structures ISOP based FB-PS DC-DC converter. However, the modular manner will be applied only on the high-frequency transformer and the second FB converter. The analysis is not restricted to unidirectional power flow and can be applied for bidirectional power flow according to an embodiment.

Figure 6:
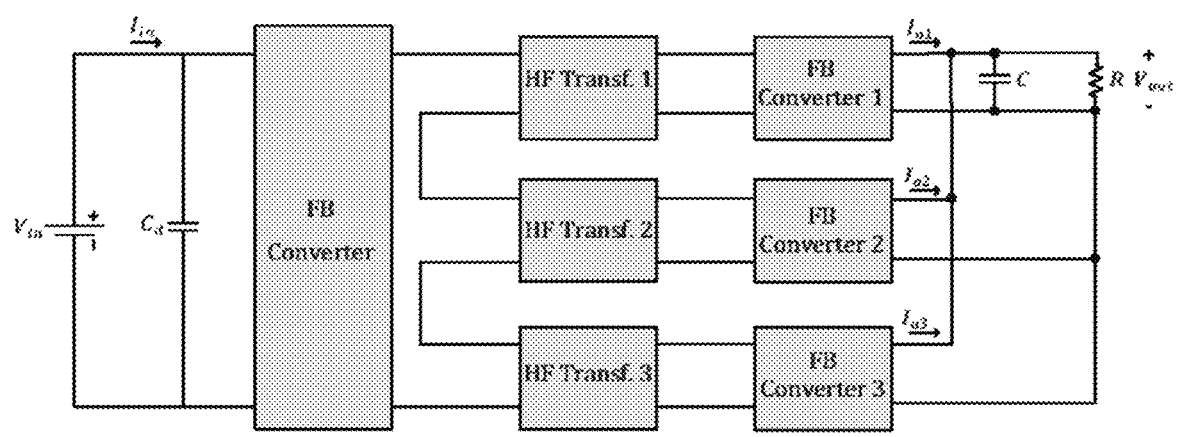
FIG. 6 is a schematic diagram of a three-module ISOP fast charger DC-DC converter circuit according to an embodiment of the present disclosure.

According to an embodiment of the present disclosure, an ISOP converter is provided and shown in FIG. 6. The ISOP converter includes multiple high-frequency transformers as well as FB converters connected in series and in parallel at the input and the output respectively. By ensuring equal IVS and OCS, the input voltage for each module is reduced to $$\frac{V_{in}}{3},$$

and the output current of each module is reduced to $$\frac{I_o}{3}.$$

In which, $V_{in}$ and $I_o$ are me ISOP input voltage and ISOP output current, respectively.

Each module will be rated at 1.5 kW and to achieve the desired power rating which is 4.5 kW three modules are connected in series at the input side and connected in parallel at the output side are required. According to the mentioned specifications at the input side, it is decided to employ only one FB converter that has the capability to handle the input current 13.26 A. However, due to the high output current 93.75 A, modular approach is required to avoid high losses and achieve the highest efficiency.

Figure 7:
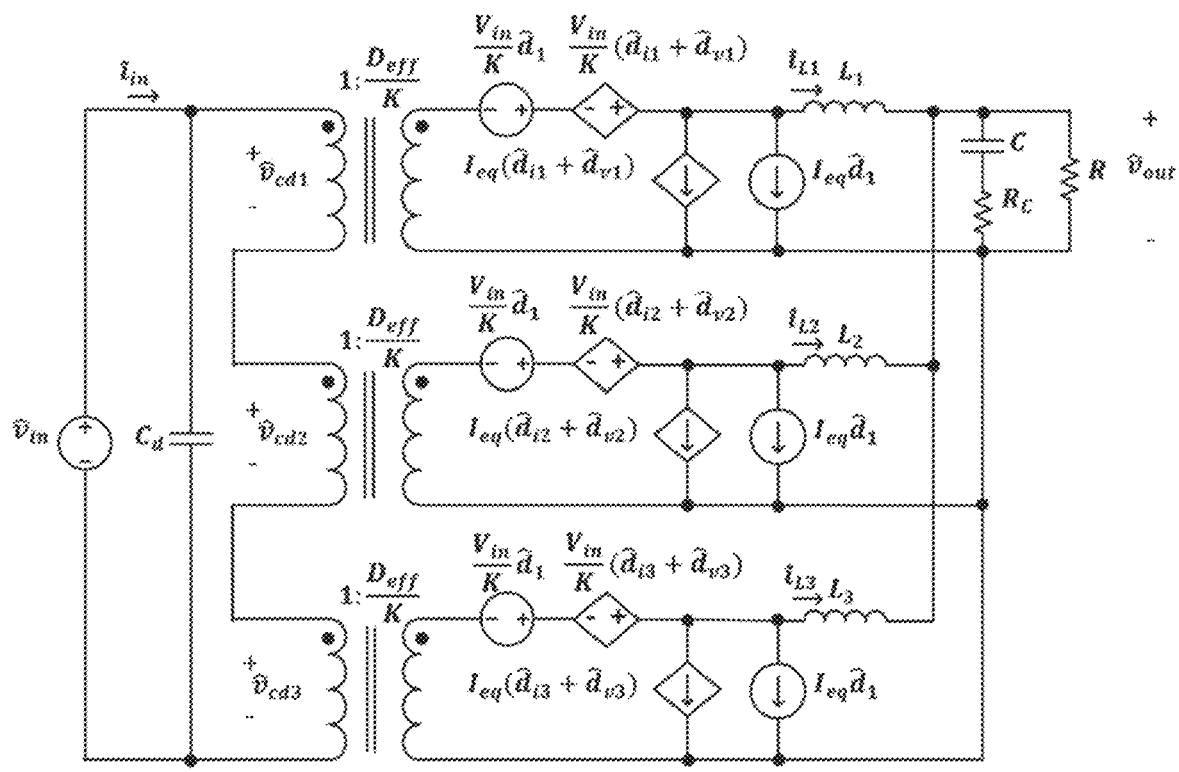
FIG. 7 is a schematic diagram of an ISOP fast charger DC-DC converter small-signal model according to an embodiment of the present disclosure.

Using the small-signal circuit for the FB-PS DC-DC converter, the small-signal circuit model is provided and shown in FIG. 7.

Based on the feature of modularity and to reduce the small-signal transfer functions in terms of complexity, it is assumed that all modules have an equal effective duty cycle, transformer turns ratio, capacitor, and inductor values. Accordingly, $K_1=K_2=K_3=K$, $C_1=C_2=C_3=C$ and $L_1=L_2=L_3=L$. In addition, it is also assumed that the modules share the same input voltage. Accordingly, the DC input voltage of each module is $$\frac{V_{in}}{3}.$$

In addition, the ESR of the output capacitance is considered in this model, however, it can be eliminated for simplicity. Since the input voltage for each module is $$\frac{V_{in}}{3},$$

and the output current of each module is $$\frac{I_o}{3},$$

accordingly, the load resistance for each module is 3R.

Accordingly, the values for the six parameters that are previously defined are known and shown in Table 2.

TABLE 2

VALUES FOR THE SIX PARAMETERS OF
THE ISOP FAST CHARGER DC-DC CONVERTER

Defined Variables

| | | |
|---|---|---|
| Input Side | α | 1 |
| | β | 3 |
| | γ | 1 |
| Output Side | a | 3 |
| | b | 1 |
| | c | 3 |

Substituting the six parameters with their values in equations (15), (18), (24), and (27) would result in the following transfer functions presented in Table 3.

TABLE 3

GENERALIZED MODEL VERIFICATION WITH THE
THREE MODULE ISOP DC-DC CONVERTER.

Transfer functions for three-module ISOP DC-DC converter

| | |
|---|---|
| $G_{vd}$ | $\dfrac{\dfrac{V_{in}}{3K}(1+sR_cC)}{s^2LC\left(1+\dfrac{R_c}{R}\right)+s\left(\dfrac{L}{R}+R_dC\left(1+\dfrac{R_c}{R}\right)+3R_cC\right)+\dfrac{R_d}{R}+3}$ |
| $G_{id}$ | $\dfrac{\dfrac{V_{in}}{3K}(1+sRC+sR_cC)}{R\left(s^2LC\left(1+\dfrac{R_c}{R}\right)+s\left(\dfrac{L}{R}+R_dC\left(1+\dfrac{R_c}{R}\right)+3R_cC\right)+\dfrac{R_d}{R}+3\right)}$ |
| $Z_{out}$ | $\dfrac{(R_d+sL)(1+sR_cC)}{s^2LC\left(1+\dfrac{R_c}{R}\right)+s\left(\dfrac{L}{R}+R_dC\left(1+\dfrac{R_c}{R}\right)+3R_cC\right)+\dfrac{R_d}{R}+3}$ |
| $G_{vg}$ | $\dfrac{\dfrac{D_{eff}}{K}\left(1+\dfrac{R_d}{3R}\right)(1+sR_cC)}{s^2LC\left(1+\dfrac{R_c}{R}\right)+s\left(\dfrac{L}{R}+R_dC\left(1+\dfrac{R_c}{R}\right)+3R_cC\right)+\dfrac{R_d}{R}+3}$ |

However, the first two transfer functions which are the control-to-output voltage and control to filter inductor current are found assuming that $\hat{d}_k=0$, w k=1, 2, ..., n and k≠j. In other words, these two transfer functions are found with respect to the effect of the duty cycle perturbation of only one module. However, since only one module is available at the primary side, the duty cycle perturbation $\hat{d}_1$ will appear three times. Therefore, $$G_{vd}=\frac{\hat{v}_{out}}{3\hat{d}_1} \text{ and } G_{id}=\frac{\hat{i}_L}{3\hat{d}_1}.$$

Accordingly, Table 3 is updated resulting in Table 4.

TABLE 4

GENERALIZED MODEL VERIFICATION WITH THE THREE MODULE ISOP DC-DC CONVERTER.

Transfer functions for three-module ISOP DC-DC converter $G_{vd}$ $$\frac{\frac{V_{in}}{K}(1+sR_cC)}{s^2LC\left(1+\frac{R_c}{R}\right)+s\left(\frac{L}{R}+R_dC\left(1+\frac{R_c}{R}\right)+3R_cC\right)+\frac{R_d}{R}+3}$$

$G_{id}$ $$\frac{\frac{V_{in}}{K}(1+sRC+sR_cC)}{R\left(s^2LC\left(1+\frac{R_c}{R}\right)+s\left(\frac{L}{R}+R_dC\left(1+\frac{R_c}{R}\right)+3R_cC\right)+\frac{R_d}{R}+3\right)}$$

$Z_{out}$ $$\frac{(R_d+sL)(1+sR_cC)}{s^2LC\left(1+\frac{R_c}{R}\right)+s\left(\frac{L}{R}+R_dC\left(1+\frac{R_c}{R}\right)+3R_cC\right)+\frac{R_d}{R}+3}$$

$G_{vg}$ $$\frac{\frac{D_{eff}}{K}\left(1+\frac{R_d}{3R}\right)(1+sR_cC)}{s^2LC\left(1+\frac{R_c}{R}\right)+s\left(\frac{L}{R}+R_dC\left(1+\frac{R_c}{R}\right)+3R_cC\right)+\frac{R_d}{R}+3}$$

Power Sharing In the ISOP Fast Charger DC-DC Converter

Modules in practical applications are not identical and any mismatch in the parameter values can cause unequal power distribution among the modules. Consequently, the voltage of a single module is unbalanced, in addition, modules that are heavily loaded are thermally overstressed. Accordingly, a control scheme that ensures uniform power sharing among the modules is needed to achieve reliable operation for the ISIP-OSOP DC-DC converter. For instance, if the connection is ISOP, then a control scheme that ensures IVS and OCS is needed. If the connection is ISIPOS, then a control scheme that ensures IVS, ICS, and OVS is needed.

According to an embodiment, the converter is connected in series at the input side and in parallel at output side. Therefore, a control scheme that ensures IVS and OCS is needed.

A control scheme for an active power balancing between the modules is addressed for the three-module ISOP DC-DC converter according to an embodiment.

Assuming the modules as shown in FIG. 6 are lossless, the input and output power relationship of each module can be expressed as:

$$\begin{cases} V_{cd1}I_{in} = V_{out}I_{out1} \\ V_{cd2}I_{in} = V_{out}I_{out2} \\ V_{cd3}I_{in} = V_{out}I_{out3} \end{cases} \quad (28)$$

Where $V_{cd1}$, $V_{cd2}$, and $V_{cd3}$ are the DC input voltages across the transformer windings for module 1 and 2 and 3 respectively, $I_{out1}$, $I_{out2}$ and $I_{out3}$ are the output currents for modules 1, 2, and 3 respectively, $I_{in}$ and $V_{out}$ are the input voltage and the output voltage for the three modules.

If OCS is accomplished, meaning that $I_{out1}=I_{out2}=I_{out3}$. Therefore, according to (28), the following equation is obtained.

$$V_{cd1}I_{in}=V_{cd2}I_{in}=V_{cd3}I_{in} \quad (29)$$

It can be concluded from (29) that $V_{cd1}=V_{cd2}=V_{cd3}$, meaning that if OCS is achieved among the three modules, IVS sharing is also achieved.

Alternatively, if IVS is achieved, meaning that $$V_{cd1}=V_{cd2}=V_{cd3}=\frac{V_{in}}{3}.$$

Therefore, according to (28), it can be concluded from (30) that $I_{out1}=I_{out2}=I_{out3}$, meaning that if IVS is achieved among the three modules, OCS is also achieved. Consequently, in order to recognize output side control, an output voltage control for the overall converter as well as output current controller are dedicated; to ensure stable operation for the parallel connected modules. To achieve uniform power distribution, the output voltage control in addition to the overall control scheme are described where the small-signal analysis is used and will be further described.

$$V_{out}I_{out1}=V_{out}I_{out2}=V_{out}I_{out3} \quad (30)$$

The effect of changing the filter inductor current and the effect of changing the input voltage on the duty cycle modulation which are $\hat{d}_{ij}$ and $\hat{d}_{vj}$, respectively, as well as $I_{eq}$ are updated according to the parameters listed in Table 2.

$$\hat{d}_{ij}=-\frac{12L_{lk}f_s}{KV_{in}}\hat{\imath}_{Lj},\ j=1,2,3 \quad (31)$$

Equation (31) can be written as follows by substituting $R_d$ which is previously defined in section V.

$$\hat{d}_{ij}=-\frac{3KR_d}{V_{in}}\hat{\imath}_{Lj},\ j=1,2,3 \quad (32)$$

$$\hat{d}_{vj}=-\frac{4L_{lk}f_sD_{eff}}{k^2RV_{in}}\hat{v}_{cdj},\ j=1,2,3 \quad (33)$$

A similar step can be done with (33):

$$\hat{d}_{vj}=-\frac{R_dD_{eff}}{RV_{in}}\hat{v}_{cdj},\ j=1,2,3 \quad (34)$$

$$I_{eq}=\frac{V_{in}}{9KR} \quad (35)$$

The following small-signal equations for the proposed ISOP DC-DC converter are obtained by applying KVL and KCL:

$$\begin{cases} \frac{D_{eff}}{K}\hat{v}_{cd1}+\frac{V_{in}}{3K}(\hat{d}_{i1}+\hat{d}_{v1}+\hat{d}_1)=sL\hat{\imath}_{L1}+\hat{v}_{out} \\ \frac{D_{eff}}{K}\hat{v}_{cd2}+\frac{V_{in}}{3K}(\hat{d}_{i2}+\hat{d}_{v2}+\hat{d}_1)=sL\hat{\imath}_{L2}+\hat{v}_{out} \\ \frac{D_{eff}}{K}\hat{v}_{cd3}+\frac{V_{in}}{3K}(\hat{d}_{i3}+\hat{d}_{v3}+\hat{d}_1)=sL\hat{\imath}_{L3}+\hat{v}_{out} \end{cases} \quad (36)$$

$$\begin{cases} \frac{K}{D_{eff}}(\hat{\imath}_{in}-sC_d\hat{v}_{in})=I_{eq}(\hat{d}_{i1}+\hat{d}_{v1}+\hat{d}_1)+\hat{\imath}_{L1} \\ \frac{K}{D_{eff}}(\hat{\imath}_{in}-sC_d\hat{v}_{in})=I_{eq}(\hat{d}_{i2}+\hat{d}_{v2}+\hat{d}_1)+\hat{\imath}_{L2} \\ \frac{K}{D_{eff}}(\hat{\imath}_{in}-sC_d\hat{v}_{in})=I_{eq}(\hat{d}_{i3}+\hat{d}_{v3}+\hat{d}_1)+\hat{\imath}_{L3} \end{cases} \quad (37)$$

$$\sum_{j=1}^{3} \hat{v}_{cdj} = \hat{v}_{in} \quad (38)$$

$$\sum_{j=1}^{3} \hat{i}_{Lj} = \frac{\hat{v}_{out}}{\left(R_c + \frac{1}{sC}\right) // R} \quad (39)$$

$$\sum_{j=1}^{3} \hat{i}_{Lj} = \hat{v}_{out}\left(\frac{sRC + sR_cC + 1}{R(1 + sR_cC)}\right) \quad (40)$$

One objective for the ISOP control is to ensure equal power sharing between the modules, such that IVS and OCS are achieved. A direct OCS control scheme having a closed loop controller is provided according to an embodiment of the present disclosure. The OCS control scheme includes one outer output current loop and three inner current loops. The output current loop generates the common reference to the three inner current loops, where the current feedback for the individual module is its own output current and not the summation of the other two output currents. The ISOP DC-DC converter configuration would lead to a stable control scheme through the direct OCS control.

The present disclosure provides DC-DC converters for fast chargers, it should be noted that as the charging rate increases, the battery can be exposed to overcharging or overheating. This threatens the lifetime of the battery. Accordingly, it should terminate the charging process once the battery is fully charged to avoid overcharging the battery. Therefore, the control scheme designed for the three-module ISOP DC-DC converter is current controlled considering reflex charging method including burp charging or negative pulse charging. This charging method is based on applying a short negative pulse or a short discharge pulse during the charging cycle. Such algorithm offers great advantages that can be highlighted in: shortening the charging time and lowering the rise in temperature. Generally, the reflex charging method includes three charging sequences which are: positive charging pulse, rest period where no charging occurs, and a negative charging pulse or a discharge pulse. Accordingly, the designed control scheme is based on controlling the output current of the ISOP DC-DC converter such that the output current profile is based on reflex charging as shown in FIG. 8.

Figure 8:
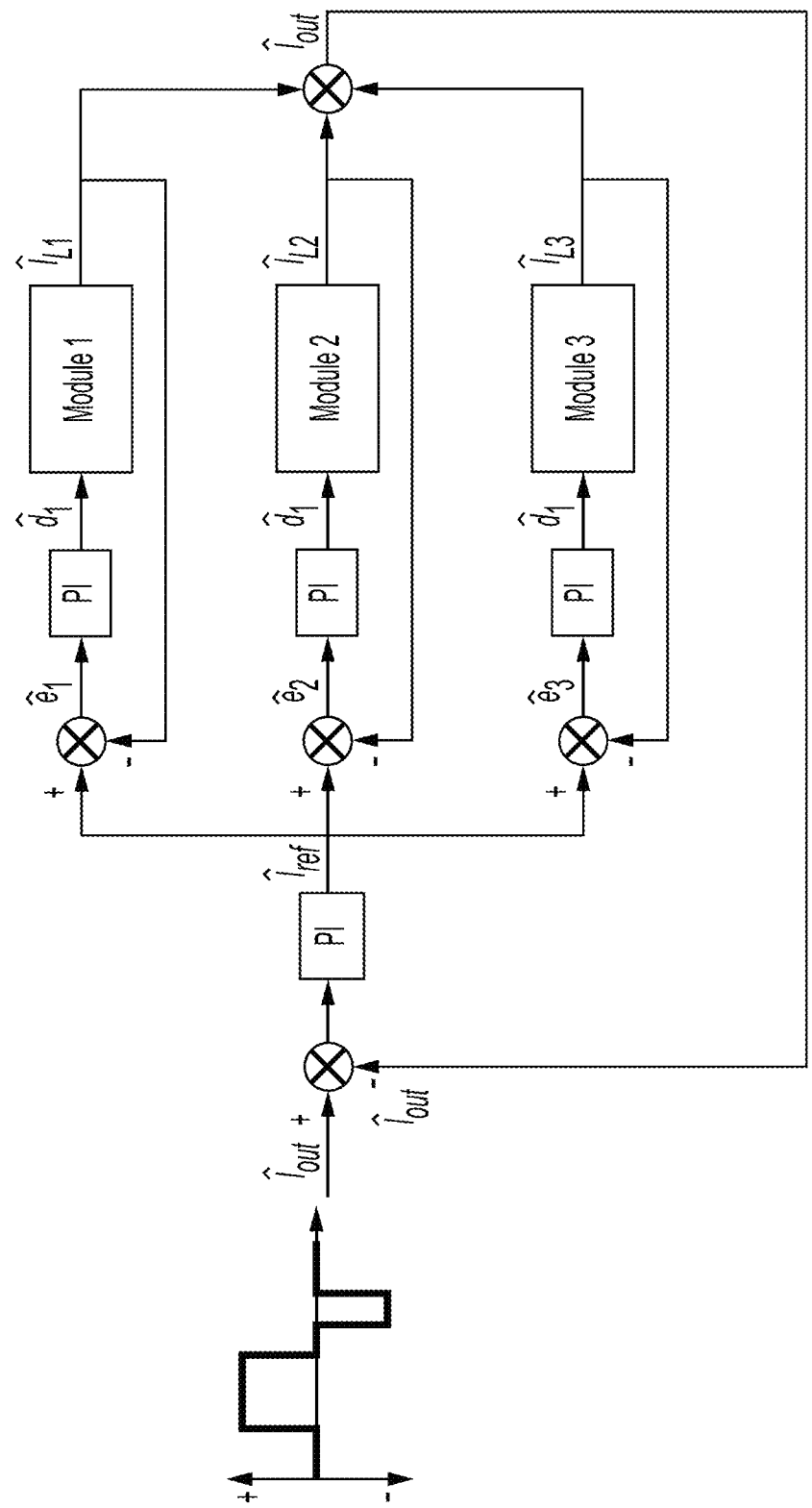
FIG. 8 is a schematic diagram of an OCS control scheme for a three-module ISOP fast charger DC-DC converter according to an embodiment of the present disclosure.
Figure 9A:
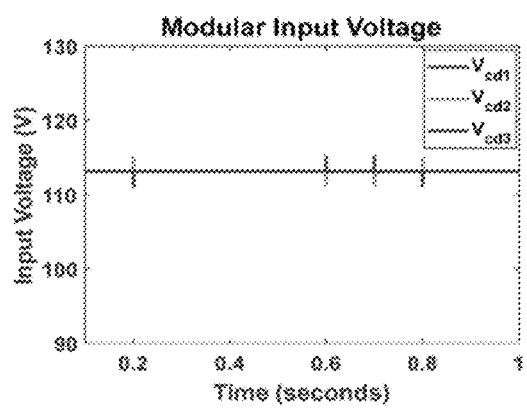
FIGS. 9A-9D are diagrams of simulation results of a control scheme for a three-module ISOP fast charger DC-DC converter according to an embodiment of the present disclosure.
Figure 9B:
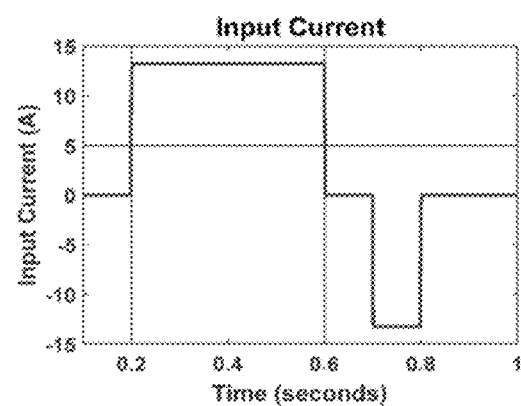
Figure 9C:
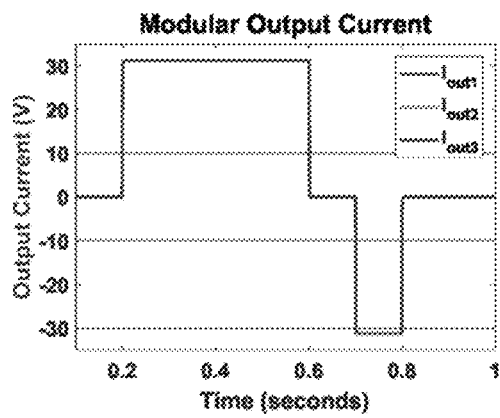
Figure 9D:
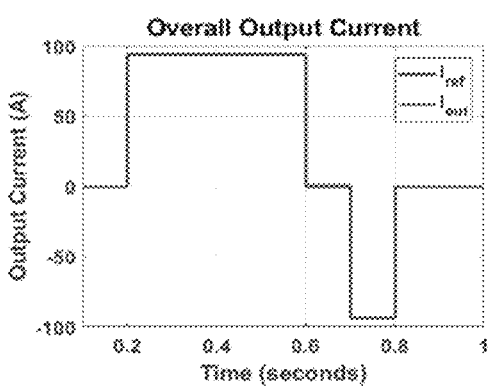

FIG. 8 illustrates the OCS control scheme for the three-module ISOP DC-DC converter. It can be seen from FIG. 8 that the control scheme includes an outer current loop and three inner current loops. The reference signal $\hat{i}_{ref}$ is provided to the individual current loops by the output current loop. The current feedback of module 1 is its own output current and this applies also to module 2 and 3. In steady state conditions, all the current feedbacks follow the common reference $\hat{i}_{ref}$ provided by the output current loop with zero static errors. Consequently, the following equation is obtained:

$$\hat{i}_{ref} = \hat{i}_{L1} = \hat{i}_{L2} = \hat{i}_{L3} \quad (41)$$

From the KVL equation presented in equation (36), the control-to-output current can be found. This is done by substituting (32), (34), and substituting $\hat{v}_{out}$ in terms of $\Sigma_{j=1}^{3}\hat{i}_{Lj}$ as well as setting $\hat{v}_{cdj}=0$. By doing so, the following equation is obtained:

$$\begin{cases} \left(sL + R_d + \frac{R}{sRC+1}\right)\hat{i}_{L1} + \frac{R}{sRC+1}\hat{i}_{L2} + \frac{R}{sRC+1}\hat{i}_{L3} = \frac{V_{in}}{3K}\hat{d}_1 \\ \frac{R}{sRC+1}\hat{i}_{L1} + \left(sL + R_d + \frac{R}{sRC+1}\right)\hat{i}_{L2} + \frac{R}{sRC+1}\hat{i}_{L3} = \frac{V_{in}}{3K}\hat{d}_1 \\ \frac{R}{sRC+1}\hat{i}_{L1} + \frac{R}{sRC+1}\hat{i}_{L2} + \left(sL + R_d + \frac{R}{sRC+1}\right)\hat{i}_{L3} = \frac{V_{in}}{3K}\hat{d}_1 \end{cases} \quad (42)$$

Equation (42) can be represented in a matrix form such that:

$$\begin{Bmatrix} a(s) & b(s) & b(s) \\ b(s) & a(s) & b(s) \\ b(s) & b(s) & a(s) \end{Bmatrix} = \begin{bmatrix} \frac{V_{in}}{3K} \\ \frac{V_{in}}{3K} \\ \frac{V_{in}}{3K} \end{bmatrix}\hat{d}_1 \quad (43)$$

Where $a(s) = sL + R_d + \frac{R}{sRC+1}$ and $b(s) = \frac{R}{sRC+1}$.

From (43) the control-to-output current transfer function is obtained as follows:

$$\hat{i}_{Lj} = \frac{V_{in}A(s)}{B(s) - \frac{2RV_{in}}{B(s)}}\hat{d}_1, \, j = 1, 2, \text{ and } 3 \quad (44)$$

Where;

$$A(s) = s^2LRC + s(L + R_dRC) + R_d + 2R \quad (45)$$

$$B(s) = 3K(s^3L^2RC + s^2(L^2 + 2LR_dRC) + s(2LR_d + 3LR + R_d^3RC) + R_d^2 + 3R_dR) \quad (46)$$

The relation between the individual module input voltage and the output currents can be found using the KCL equation presented in (37). This is done by equating the first two equations in (37) and substituting (32), (34), and (35) such that:

$$\frac{V_{in}}{9KR}\left(-\frac{3KR_d}{V_{in}}\hat{i}_{L1} + \frac{R_dD_{eff}}{RV_{in}}\hat{v}_{cd1} + \hat{d}_1\right) + \hat{i}_{L1} = \frac{V_{in}}{9KR}\left(-\frac{3KR_d}{V_{in}}\hat{i}_{L2} + \frac{R_dD_{eff}}{RV_{in}}\hat{v}_{cd2} + \hat{d}_1\right) + \hat{i}_{L2} \quad (47)$$

Further simplification for (47) would result in (48).

$$\left(1 - \frac{R_d}{3R}\right)\hat{i}_{L1} + \frac{R_dD_{eff}}{9KR^2}\hat{v}_{cd1} = \left(1 - \frac{R_d}{3R}\right)\hat{i}_{L2} + \frac{R_dD_{eff}}{9KR^2}\hat{v}_{cd2} \quad (48)$$

From (48), the following is obtained:

$$y(\hat{v}_{cd2} - \hat{v}_{cd1}) = x(\hat{i}_{L2} - \hat{i}_{L1}) \quad (49)$$

Where; $x = \left(1 - \frac{R_d}{3R}\right)$ and $y = \frac{R_dD_{eff}}{9KR^2}$.

From (49), $\hat{v}_{cd2}$ can be found such that:

$$\hat{v}_{cd2} = \hat{v}_{cd1} + \frac{x}{y}(\hat{i}_{L2} - \hat{i}_{L1}) \tag{50}$$

Generalizing equation (50) would result in:

$$\hat{v}_{cdj} = \hat{v}_{cd1} + \frac{x}{y}(\hat{i}_{Lj} - \hat{i}_{L1}), j = 1, 2 \text{ and } 3 \tag{51}$$

Setting $\hat{v}_{in}=0$, and substituting (51) in (38) would give:

$$\sum_{j=1}^{3} \hat{v}_{cd1} + \frac{x}{y}(\hat{i}_{Lj} - \hat{i}_{L1}) = 0 \tag{52}$$

$$3\hat{v}_{cd1} + 3\frac{x}{y}\hat{i}_{L1} + \sum_{j=1}^{3} \frac{x}{y}\hat{i}_{Lj} = 0 \tag{53}$$

Therefore, $$\hat{v}_{cd1} = \frac{x}{y}\hat{i}_{L1} + \frac{x}{3y}\sum_{j=1}^{3}\hat{i}_{Lj} = 0 \tag{54}$$

Substituting (54) in (51) would result in:

$$\hat{v}_{cd1} = \frac{x}{y}\hat{i}_{Lj} + \frac{x}{3y}\sum_{j=1}^{3}\hat{i}_{Lj}, j = 1, 2, \text{ and } 3 \tag{55}$$

Equation (55) can be presented in a matrix form such that:

$$\begin{bmatrix} \hat{v}_{cd1} \\ \hat{v}_{cd2} \\ \hat{v}_{cd3} \end{bmatrix} = \begin{bmatrix} \frac{2x}{3y} & \frac{-x}{3y} & \frac{-x}{3y} \\ \frac{-x}{3y} & \frac{2x}{3y} & \frac{-x}{3y} \\ \frac{-x}{3y} & \frac{-x}{3y} & \frac{2x}{3y} \end{bmatrix} \begin{bmatrix} \hat{i}_{L1} \\ \hat{i}_{L2} \\ \hat{i}_{L3} \end{bmatrix} \tag{56}$$

To study the fluctuation in the individual module's input voltage due to disturbances, it is assumed that $\hat{v}_{in}=0$, where the perturbation in $\hat{v}_{cdj}$, j=1, 2, and 3 is analyzed due to the disturbance in the load current.

According to the OCS control scheme block diagram shown in FIG. 8, perturbations in the load currents can be written as:

$$\begin{cases} \hat{i}_{L1} = G_{iLd}G_{PI}(\hat{i}_{ref} - \hat{i}_{L1}) \\ \hat{i}_{L2} = G_{iLd}G_{PI}(\hat{i}_{ref} - \hat{i}_{L2}) \\ \hat{i}_{L3} = G_{iLd}G_{PI}(\hat{i}_{ref} - \hat{i}_{L3}) \end{cases} \tag{57}$$

Where; $G_{iLd}$ is the control-to-output current transfer function and $G_{PI}$ is the PI controller transfer function.

Substituting (57) in (56) would give:

$$\hat{v}_{cd1} = \frac{x}{3y}G_{iLd}G_{PI}(-2\hat{i}_{L1} + \hat{i}_{L2} + \hat{i}_{L3}) \tag{58}$$

Where the term $-2\hat{i}_{L1}$ can be written as $\hat{i}_{L1}-3\hat{i}_{L1}$. Accordingly, the following generalized equation is obtained.

$$\hat{v}_{cdj} = \frac{x}{3y}G_{iLd}G_{PI}(-3\hat{i}_{Lj} + \hat{i}_{out}), j = 1, 2, \text{ and } 3 \tag{59}$$

It can be seen from the OCS control scheme block diagram that the inner feedbacks track the common reference signal $\hat{i}_{ref}$ provided by the outer output voltage loop such that: $\hat{i}_{ref}=\hat{i}_{L1}=\hat{i}_{L2}=\hat{i}_{L3}$ and according to equation (59), the following is obtained.

$$\hat{v}_{cd1} = \hat{v}_{cd2} = \hat{v}_{cd3} = \frac{\hat{v}_{in}}{3} = 0 \tag{60}$$

Consequently, it can be concluded from (60) that the fluctuation in the input voltage per module is unaffected and kept equal to zero even when the load current changes.

Simulation Results

A dedicated power balancing control offers a uniform power distribution among the modules, hence, ensuring reliable, safe, and stable operation in the existence of external transients and parameter mismatch. The overall control scheme (controller) for the ISOP DC-DC converter is examined.

The controller is tested considering a three-module ISOP DC-DC converter with a rated power of 4.5 kW and an input voltage of 340 V. The power balancing controller's effectiveness is assessed considering parameter mismatch as presented in Table 5. In other words, to test the controller's power balancing capability when handling uncertainties, the component parameters for each module are assumed to be different.

TABLE 5

SYSTEM PARAMETERS USED IN SIMULATION.

| Parameters | Module 1 | Module 2 | Module 3 |
| --- | --- | --- | --- |
| Rated power for the overall converter | | 4.5 kW | |
| Rated power per module | | 1.5 kW | |
| Total input voltage | | 339.41 V | |
| Input voltage per module | | 113.14 kV | |
| Total output voltage | | 48 V | |
| Output voltage per module | | 48 V | |
| Number of modules | | 3 | |
| Transformer's turns ratio | 1.89:1 | 1.79:1 | 1.69:1 |
| Transformer's leakage inductance | 1.1431 µH | 1.025 µH | 0.914 µH |
| Effective duty cycle | 0.8 | 0.759 | 0.717 |
| Output filter inductor | 50 mH | 60 mH | 60 mH |
| Output capacitance | 300 µF | 350 µF | 300 µF |
| Load resistance | | 0.512 Ω | |
| Switching frequency | | 100 kHz | |

The simulation results are shown in FIG. 9, the control scheme is tested by reflex charging to the output current reference signal. The charging pulse is applied such that the charging cycle starts at 0.2 s and ends at 0.6 s. After that, a rest period for 0.1 s is applied to the output current reference signal.

As can be seen from FIG. 9, the control scheme for the three-module ISOP DC-DC converter can compensate the mismatches introduced to the parameters of each module. Results shown in FIG. 9 demonstrate that the power-sharing controller as illustrated in FIG. 8 compensate the negative influences resulting from the system parameters mismatch. The modular input voltages and the modular output currents are equally sharing between the four modules. In addition, the output current of the DC-DC converter follows the reference signal applied based on reflex charging. Consequently, it can be concluded that the control scheme (power-sharing controller) is reliable and achieve equal power distribution between the modules.

The present technology including the modular DC-DC converter as described herein provides a number of advantages. For example, the charging process can be done from a single-phase outlet. The configuration according to an embodiment is Input-Series Output-Parallel (ISOP) DC-DC converter, where the control of the ISOP DC-DC converter can be achieved via direct Output Current Sharing (OCS) control as well as Input Voltage Sharing (IVS) without the need for IVS control loops. In other words, the control of the ISOP DC-DC converter can be achieved via OCS, and the instability problem associated with the conventional ISOP converters controlled via direct OCS is avoided. This is because the configuration of the ISOP DC-DC converter contains only a single driving capacitor at the input side according to an embodiment.

The ISOP DC-DC converter also utilizes a fewer number of semiconductor devices because only one converter is used at the input side according to an embodiment. In addition, the use of modular converters allows for low power rating switches and reduce the current stress per module. The parallel connection at the output side also allows small ripple content that will reduce the capacitor size at the output and avoid battery degradation.

According to embodiments as described herein, possible applications of the present technology including the modular DC-DC converter include, for example, Low-Speed Electric vehicles (LS-EVs), Golf carts, and utility electric vehicles. The modular DC-DC converter can also be utilized as a fast charger for EVs applications where it can provide an output current with small ripple content, and reduce the output filter capacitor size and improve the life time of the battery by avoiding significant temperature increase in the battery.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A modular DC-DC converter, comprising:
a first converter provided at an input side;
a plurality of second modular converters provided at an output side, wherein the plurality of second modular converters have a hot-swapping capability;
a plurality of high-frequency transformers provided between the first converter and the second converters, wherein the plurality of high-frequency transformers comprise a first high-frequency transformer, a second high-frequency transformer, and a third high-frequency transformer, wherein the first, second, and third high-frequency transformers are connected to each other in series;
an outer current loop; and
an inner current loop provided for each of the plurality of second modular converters,
wherein the first converter and the high-frequency transformers are connected in series at the input side, and
wherein the second converters are connected in parallel at the output side.

2. The modular DC-DC converter according to claim 1, wherein the first converter includes only one full-bridge converter.

3. The modular DC-DC converter according to claim 1, wherein the second modular converters includes at least two full-bridge converters.

4. The modular DC-DC converter according to claim 1, wherein the first converter includes at least one of a flyback converter, a forward converter, a push-pull converter, a half-bridge converter and a full-bridge converter.

5. The modular DC-DC converter according to claim 1, wherein the second modular converters include two or more of a flyback converter, a forward converter, a push-pull converter, a half-bridge converter and a full-bridge converter.

6. The modular DC-DC converter according to claim 1, further comprising a first capacitor coupled with the first converter at the input side.

7. The modular DC-DC converter according to claim 1, further comprising a second capacitor coupled with one of the second converters at the output side.

8. The modular DC-DC converter according to claim 1, wherein the second modular converters include three full-bridge converters.

9. A battery charging device, comprising:
a first converter provided at an input side;
a plurality of second modular converters provided at an output side, wherein the plurality of second modular converters have a hot-swapping capability; and
a plurality of high-frequency transformers provided between the first converter and the second converters, wherein the plurality of high-frequency transformers comprise a first high-frequency transformer, a second high-frequency transformer, and a third high-frequency transformer, wherein the first, second, and third high-frequency transformers are connected to each other in series;
an outer current loop; and
an inner current loop provided for each of the plurality of second modular converters,
wherein the first converter and the high-frequency transformers are connected in series at the input side, and
wherein the second converters are connected in parallel at the output side.

10. The battery charging device according to claim 9, wherein the first converter includes only one full-bridge converter.

11. The battery charging device according to claim 9, wherein the second modular converters includes at least two full-bridge converters.

12. The battery charging device according to claim 9, wherein the first converter includes at least one of a flyback converter, a forward converter, a push-pull converter, a half-bridge converter and a full-bridge converter.

13. The battery charging device according to claim 9, wherein the second modular converters include two or more of a flyback converter, a forward converter, a push-pull converter, a half-bridge converter and a full-bridge converter.

14. The battery charging device according to claim 9, further comprising a first capacitor coupled with the first converter at the input side.

15. The battery charging device according to claim 9, further comprising a second capacitor coupled with one of the second converters at the output side.

16. The battery charging device according to claim 9, wherein the second modular converters include three full-bridge converters.

* * * * *